United States Patent
Morita

(10) Patent No.: US 9,195,160 B2
(45) Date of Patent: Nov. 24, 2015

(54) IMAGE FORMING APPARATUS AND IMAGE FORMING METHOD FOR CORRECTING REGISTRATION DEVIATION

(75) Inventor: Seijiro Morita, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 139 days.

(21) Appl. No.: 13/372,561

(22) Filed: Feb. 14, 2012

(65) Prior Publication Data

US 2012/0206737 A1   Aug. 16, 2012

(30) Foreign Application Priority Data

Feb. 15, 2011   (JP) ................. 2011-029590

(51) Int. Cl.
| G03G 15/01 | (2006.01) |
| H04N 1/04 | (2006.01) |
| H04N 1/60 | (2006.01) |
| H04N 1/047 | (2006.01) |

(52) U.S. Cl.
CPC ......... *G03G 15/0178* (2013.01); *H04N 1/0473* (2013.01); *H04N 1/603* (2013.01); *G03G 2215/0119* (2013.01); *G03G 2215/0161* (2013.01); *H04N 2201/0094* (2013.01); *H04N 2201/04787* (2013.01); *H04N 2201/04791* (2013.01); *H04N 2201/04793* (2013.01); *H04N 2201/04796* (2013.01)

(58) Field of Classification Search
CPC ... H04N 1/3871; H04N 1/0473; H04N 1/603; G03G 15/0178
USPC .......................................................... 358/1.2
See application file for complete search history.

(56) References Cited

U.S. PATENT DOCUMENTS

| 5,602,781 A | * | 2/1997 | Isobe ....................... 365/189.05 |
| 5,737,342 A | * | 4/1998 | Ziperovich .................... 714/736 |
| 6,118,463 A | * | 9/2000 | Houki et al. .................. 347/116 |
| 6,396,507 B1 | * | 5/2002 | Kaizuka et al. ............... 345/661 |
| 6,449,064 B1 | * | 9/2002 | Hattori et al. ................. 358/403 |

(Continued)

FOREIGN PATENT DOCUMENTS

| CN | 101183227 A | 5/2008 |
| JP | 2001-080125 A | 3/2001 |

(Continued)

OTHER PUBLICATIONS

JP2009-27683A,Higashiyama, Makoto, Feb. 2009, Japan English Language Machine Translation.*

(Continued)

*Primary Examiner* — Marivelisse Santiago Cordero
*Assistant Examiner* — Daryl Jackson
(74) *Attorney, Agent, or Firm* — Carter, DeLuca, Farrell & Schmidt, LLP

(57) ABSTRACT

Since memory access is performed on a large number or discontinuous address regions, the performance of memory access is significantly degraded; in a system that performs high speed image formation, registration deviation cannot be corrected. Sub scanning position information corresponding to the profile of registration deviation is set, and image correction processing is divided into two stages, high resolution correction processing using line buffers formed with a memory which allows high speed random access and low resolution correction processing using a memory whose capacity is easily increased.

15 Claims, 8 Drawing Sheets

(56) References Cited

U.S. PATENT DOCUMENTS

| | | | |
|---|---|---|---|
| 7,619,790 B2* | 11/2009 | Kambegawa et al. | 358/500 |
| 8,064,094 B2* | 11/2011 | Kaima et al. | 358/1.2 |
| 2002/0091902 A1* | 7/2002 | Hirofuji | 711/133 |
| 2003/0090560 A1* | 5/2003 | Miyagawa et al. | 347/225 |
| 2004/0246507 A1* | 12/2004 | Hattori | 358/1.2 |
| 2005/0041262 A1* | 2/2005 | Aoki | 358/1.13 |
| 2006/0050158 A1 | 3/2006 | Irie | |
| 2009/0174913 A1* | 7/2009 | Ikeda et al. | 358/474 |
| 2009/0190178 A1* | 7/2009 | Saito | 358/1.16 |
| 2009/0213419 A1* | 8/2009 | Shirai et al. | 358/1.15 |
| 2010/0182640 A1* | 7/2010 | Daigo | 358/1.15 |
| 2010/0253981 A1* | 10/2010 | Higashiyama et al. | 358/3.26 |
| 2011/0122464 A1* | 5/2011 | Suzuki | 358/505 |

FOREIGN PATENT DOCUMENTS

| | | | |
|---|---|---|---|
| JP | 2004-170755 A | | 6/2004 |
| JP | 2007-193143 A | | 8/2007 |
| JP | 2008-055717 A | | 3/2008 |
| JP | 2008-148291 A | | 6/2008 |
| JP | 2009-27683 A | * | 2/2009 |
| JP | 2009-141544 A | | 6/2009 |

OTHER PUBLICATIONS

Chinese Office Action issued in corresponding application No. 201210041948.2 on May 19, 2014.

Japanese Office Action issued in corresponding application No. 2011-029590 on Nov. 25, 2014.

* cited by examiner

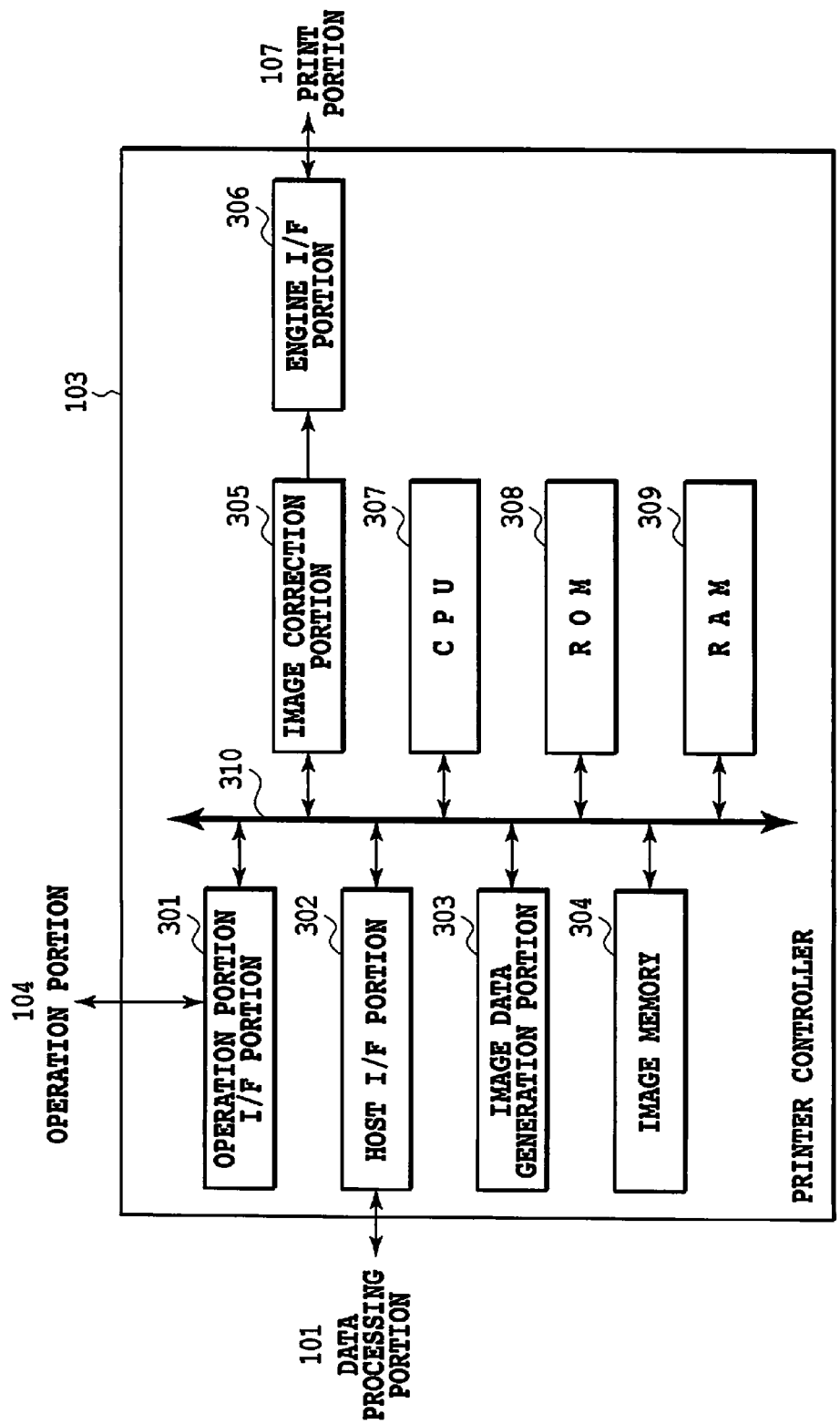

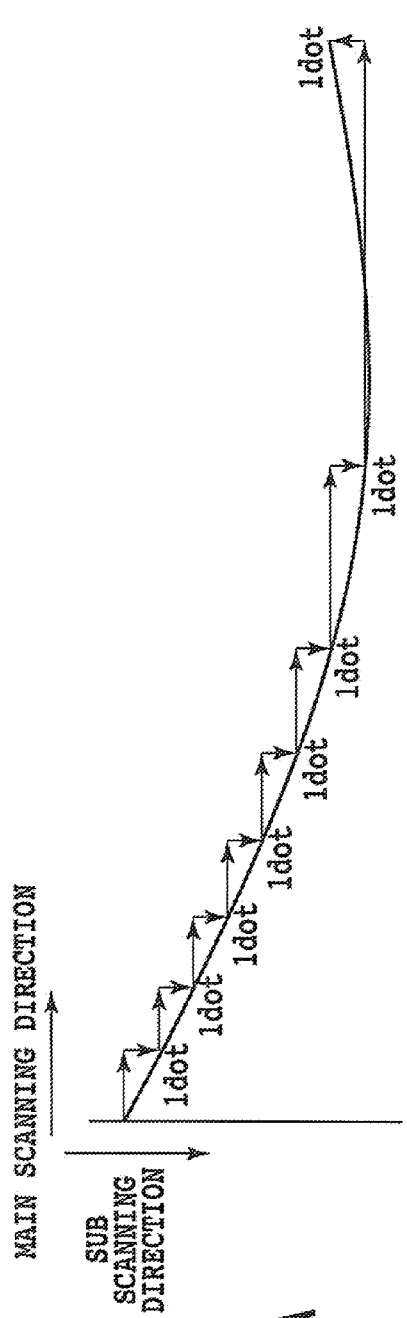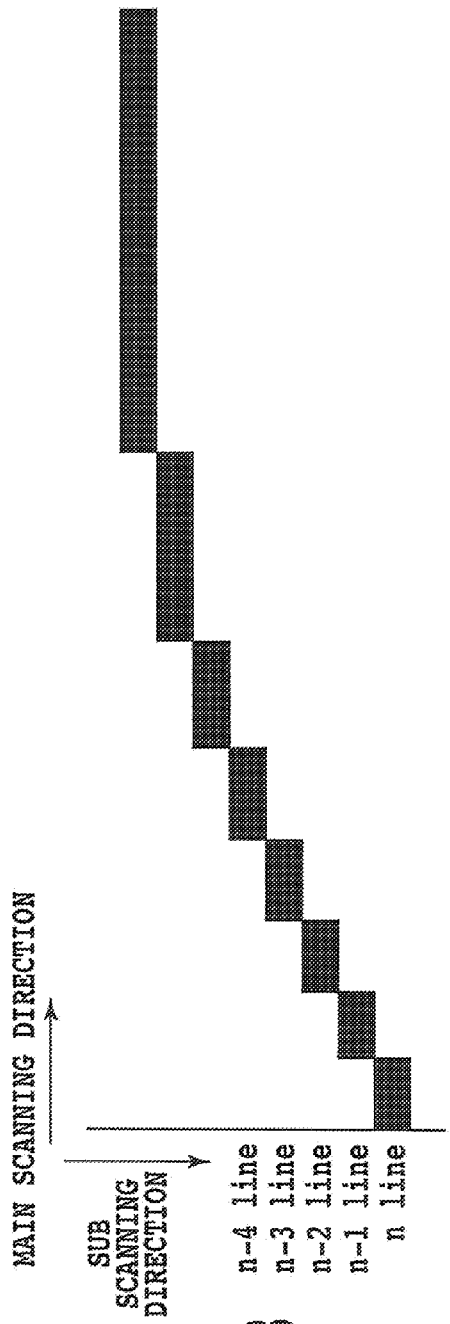

IMAGE FORMING APPARATUS AND IMAGE FORMING METHOD FOR CORRECTING REGISTRATION DEVIATION

BACKGROUND OF THE INVENTION

1. Field of the Invention

The present invention relates to an image forming apparatus and an image forming method for correcting registration deviation caused when an image is formed.

2. Description of the Related Art

In recent years, in order to increase the image formation speed of an electrophotographic color image forming apparatus (laser printer), a large number of color image forming apparatuses of a tandem system have been employed. In the tandem system, the same number of developing devices and photoconductive drums as the number of kinds of color materials (toners) are arranged, and images of different colors are sequentially transferred onto a conveyor belt or a recording sheet, and thus a color image is formed. In this type of tandem system color image forming apparatus, since the images of different colors are formed by image formation portions corresponding to those colors, a plurality of factors that causes registration deviation is present between the images of those colors. Hence, various methods for correcting registration deviation are proposed.

As one of the factors for registration deviation, the unevenness of a lens in a deflection scanning device for deflecting and scanning laser light, the displacement of a position where the lens is attached, the displacement of a position where the deflection scanning device is incorporated into the main body of the image forming apparatus or the like can be considered. When this type of problem occurs, the scanning line of laser light is inclined and curved. The degrees of inclination and curving of the scanning line (hereinafter referred to as a profile) are different from color to color, and this results in registration deviation.

As a method of coping with such registration deviation, Japanese Patent Laid-Open No. 2004-170755 discloses that the sizes of inclination and curving of the scanning line in the deflection scanning device are measured with an optical sensor, bitmap image data is corrected so as to cancel out those sizes, and an image is formed based on the corrected image data. Since, in the method of Japanese Patent Laid-Open No. 2004-170755, the registration deviation is electrically corrected by processing the image data, it is unnecessary to perform mechanical adjustment and a step of adjustment at the time of assembly.

Furthermore, Japanese Patent Laid-Open No. 2008-148291 discloses that data is read from an image memory according to the curving (curvature) of the scanning line, and the registration deviation is corrected without the use of a line buffer. Hence, as compared with the above method disclosed in Japanese Patent Laid-Open No. 2004-170755, the method of Japanese Patent Laid-Open No. 2008-148291 can advantageously cope with the registration deviation at lower cost.

In the method disclosed in Japanese Patent Laid-Open No. 2004-170755, line butters that store the bitmap data of a plurality of rounds of scanning are required. The number of line buffers depends on the width of the curving of the scanning line. For example, when the width of the curving of the scanning line corresponds to N lines of image data, line buffers that can store the image data of the N lines are required. Here, since the value of N varies in each of color image forming apparatuses, the number of line buffers that are mounted needs to correspond to the number of lines which exceeds the maximum value of the variations. When, as described above, a large number of line buffers are provided, the capacity of the memory is increased accordingly, and the size of a circuit for correcting the bitmap image data is also increased, with the result that the cost is increased. Hence, as disclosed in Japanese Patent Laid-Open No. 2008-148291, the method of reading data from the image memory without the use of the line buffers can be considered.

However, in the method disclosed in Japanese Patent Laid-Open No. 2008-148291, it is necessary to perform, according to the amount of curving of the scanning line, access to a memory that has not continuous addresses, for each line. In the access to a memory that has not continuous addresses, as the resolution of an image is higher, a larger number of accesses are required. An example of specific values is as follows when performing correction of registration deviation, on a high-resolution image having a resolution of 2400 dpi, by 1 mm in the sub scanning direction from end to end over the image with respect to the width of main scanning that allows image formation.

$$(1\ mm/25.4\ mm) \times 2400\ dpi \approx 95$$

In other words, it is necessary to perform the access to a memory that has not continuous addresses for the read addresses of the memory 95 times for each line. Since images have higher resolution nowadays, as an image has a higher resolution, the number of times of accesses to a memory that has not continuous addresses is increased. Hence, when an image having a higher resolution is dealt with, the performance of the memory access is likely to be degraded.

SUMMARY OF THE INVENTION

The present invention enhances the performance of memory access to correct registration deviation.

According to the present invention, there is provided an image forming apparatus comprising: an obtaining component configured to obtain sub scanning position information indicating a sub scanning position; a low resolution correction component configured to correct, based on the sub scanning position information, registration deviation in a unit of a resolution less than a predetermined resolution, using a second storage component; and a high resolution correction component configured to correct, based on the sub scanning position information, registration deviation in a unit of a resolution higher than the processing unit by the low resolution correction component, using a first storage component that can perform higher speed random access than the second storage component.

According to the present invention, when the registration deviation is corrected by correcting the image data, the number of times of accesses to a memory that has not continuous addresses is reduced, and this allows high speed memory access performance.

Further features of the present invention will become apparent from the following description of exemplary embodiments (with reference to the attached drawings).

BRIEF DESCRIPTION OF THE DRAWINGS

FIG. 2 is a block diagram showing the detailed configuration of a printer controller according to the first embodiment of the present invention;

FIGS. 3A and 3B are diagrams illustrating registration deviation and its correction according to the first embodiment of the present invention;

DESCRIPTION OF THE EMBODIMENTS

Before the description of embodiments of the invention, a description will first be given of the fact that as the number of times of accesses to a memory that has not continuous addresses is increased, memory performance is reduced.

Since an image forming apparatus today needs to process a large amount of image data, an image memory is often formed with a DRAM (dynamic random access memory).

Since the DRAM is different from an SRAM (static random access memory), which allows high speed random access, in that since the DRAM needs a large amount of latency to perform access, technologies for increasing the speed of access are incorporated into the DRAM. In particular, a large number of technologies for increasing the speed on the access to continuous addresses are incorporated. It can be said that the DRAM has the feature that the continuous address access allows high speed processing as compared with the random address access.

Specifically, a technology called page mode, bank interleave, or burst transfer which relates to a bus that is connected to a memory us incorporated. The page mode is processing in which, in the access of a memory block formed with rows and columns, items of data that are formed in the same row are temporarily read out in a buffer, and the procedure of accessing items of data of the same row but different columns can be simplified. The bank interleave is processing in which continuous addresses are sequentially allocated to different banks, and thus a time period needed for processing on access request can be hidden. The burst transfer is processing in which, in the access of continuous addresses, address notification processing for addresses following the address on which first memory access is performed is omitted. These types of processing described here are one example; a large number of other high speed technologies are implemented.

However, when image data is read from an image memory like the DRAM for each line according to the curving (curvature) of the scanning line, if memory access is performed on a large number of discontinuous address regions, the high speed technologies described above are not effectively utilized. Hence, it is likely that the performance of memory access is degraded, and that a system for performing high speed image formation does not function satisfactorily.

In the following embodiments, a description will be given of an example where memory access at the time of registration correction is enhanced using the SRAM which allows high speed random and the DRAM whose capacity is easily increased at relatively low cost.

The preferred embodiments of the present invention will be described below with reference to accompanying drawings. The following embodiments do not limit the present invention according to the scope of claims; all combinations of features described in the present embodiments are not necessarily mandatory for solving means of the present invention.

First Embodiment

Figure 1:
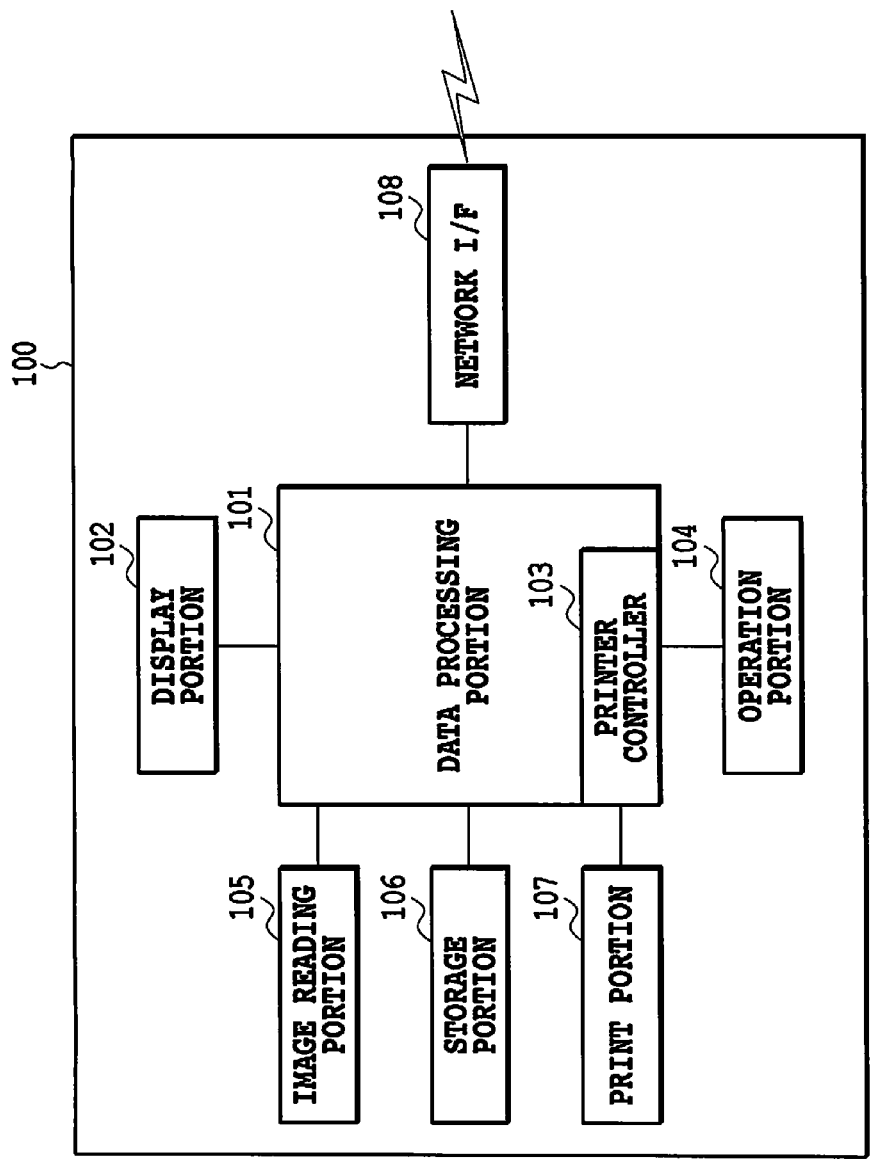
FIG. 1 is a block diagram illustrating the configuration of at color image forming apparatus (a multi-function peripheral) according to a first embodiment of the present invention.

FIG. 1 is a block diagram illustrating the configuration of a color image forming apparatus 100 according to a first embodiment of the present invention.

This image forming apparatus 100 is configured with, for example, a multi-function peripheral (MFP) which is a composite device achieving a plurality of types of functions. The image forming apparatus 100 is connected through a network I/F 108 to a network, utilizes the network and can thereby exchange various types of information such as image data with an external device connected to the network.

In FIG. 1, an image reading portion 105 including a platen and an auto document feeder (ADF) illuminates, with a light source, stacked sheets of or a sheet of original document image on the platen, and forms, with a lens, an image reflected off the document on a solid-state image pickup element (not shown). Thus, the image reading portion 105 can obtain a raster-shaped image reading signal from the solid-state image pickup element as a raster image per page with a predetermined density (for example, 600 dpi). Although, in the present embodiment, as a printed material read by the image reading portion 105, a paper document is described as an example, a printed material such as a recording medium (for example, a transparent original document such as an OHP sheet or a film or cloth) other than paper may be read by the image reading portion 105.

The image forming apparatus 100 has a copy function of printing with a print portion 107, an image corresponding to the image reading signal on a recording medium. In particular, when one set of original document image is copied, a data processing portion 101 performs image processing on the image reading signal to generate recording data, and the recording data is printed by the print portion 107 on the recording medium. On the other hand, when a plurality of sets of original document image is copied, the recording data is temporarily stored in a storage portion 106 such as an HD, and then the recording data is repeatedly output to the print portion 107 the number of times corresponding to the specified sets and is recorded on the recording medium. Various types of print control using the print portion 107 are achieved by a printer controller 103. In the present embodiment, the print portion 107 includes, for example, a printer engine of a laser printer of a tandem system.

An instruction to the image forming apparatus 100 by an operator is provided through an operation portion 104 incorporated into the image forming apparatus 100; a series of these operations are controlled by a control portion (a CPU 307 of FIG. 2) within the data processing portion 101. A display of the state of input by the operation portion 104, a display of image data being processed or the like is produced on a display portion 102. In the image forming apparatus 100, a user interface that supplies a user with various types of operations for performing various types of processing described later and displays is provided by the display portion 102 and the operation portion 104.

The detail configuration of the printer controller 103 will now be described with reference to FIG. 2. This printer controller 103 includes a host I/F portion 302. This host I/F portion 302 is provided with an input buffer (not shown) that inputs print data sent from the data processing portion 101 and a setting for specifying the operation of the image forming apparatus 100. The host I/F portion 302 is also provided with an output buffer (not shown) that temporarily holds output data including a signal to be sent to the data processing portion 101 and device information data. The host I/F portion 302 also forms an input/output portion of a signal or a communication packet exchanged with the data processing portion 101, and performs communication control with the data processing portion 101.

The print data input through the host I/F portion 302 is provided to an image data generation portion 303. The print data input here is formed with, for example, PDL (page description language) data. The image data generation portion 303 performs, with a predetermined analysis portion, analysis (for example, PDL analysis processing) on the input print data. The image data generation portion 303 then generates an intermediate language from the result of the analysis, and further generates bitmap data that can be processed by the print portion (printer engine) 107.

Specifically, the image data generation portion 303 performs analysis on the print data and creation of intermediate language information based on the analysis, and performs rasterizing processing simultaneously with the creation of the intermediate language information. This rasterizing processing includes conversion from display colors RGB (additive color mixing) included in the print data into YMCK (subtractive color mixing) that can be processed by the print portion 107. This processing also includes processing such as conversion from a character code included in the print data into previously stored font data such as a bit pattern or an outline font. Thereafter, in the rasterizing processing, the bitmap data is produced either on each page or in each band formed with predetermined lines. Then, pseudo gradation processing using a dither pattern is performed on the bitmap data, and the print portion 107 generates the bitmap data on which print processing can be performed. The bitmap data thus produced is stored in an image memory 304.

The CPU transfers the bitmap data stored in the image memory 304 to an image correction portion 305 that performs image correction processing, which will be described later. The bitmap data on which the image correction processing has been performed is transferred through an engine I/F portion 306 as a video signal to the print portion 107. The engine I/F portion 306 is provided with an output buffer (not shown) that temporarily holds recording data (video signal) to be transferred to the print portion 107 and an input buffer (not shown) that temporarily holds a signal sent out from the print portion 107. The engine I/F portion 306 configures an input/output portion of a signal exchanged with the print portion 107, and performs communication control with the print portion 107.

Various types of instructions such as an instruction on mode setting that is output thorough operation input by the user in the operation portion 104 is input through an operation portion I/F portion 301. This operation portion I/F portion 301 configures an interface between the operation portion 104 and the CPU 307. The CPU 307 performs control on the individual portions described above according to the mode indicated by the operation portion 104 or the data processing portion 101. This control is performed based on a control program stored in a ROM 308. The control program stored in the ROM 308 includes an OS for performing, with a system clock, time division control on each load module called a task. The control module includes a plurality of load modules that is controlled by the OS on an individual function basis. As an operation region for computation processing performed by the CPU 307, a RAM 309 is used. The individual portions including the CPU 307 are connected to a system bus 310. Part of the print controller such as the operation portion I/F portion 301, the host I/F portion 302, the image data generation portion 303, the image correction portion 305, the engine I/F portion 306 and the CPU 307 can be packaged as an ASIC (application-specific integrated circuit). The packaging allows common use in various types of devices, and thus it is possible to reduce the cost. The image memory 304 and the like select capacities necessary for various types of devices from general-purpose DRAMs, and can thereby optimize the cost.

The principle of correction of registration deviation will now be described with reference to FIGS. 3A and 3B. FIGS. 3A and 3E are diagrams illustrating the principle of correction of registration deviation in the embodiments of the present invention.

FIG. 3A is a diagram illustrating the degree of curving of the scanning line, that is, a profile that causes registration deviation. In the figure, the horizontal axis represents the main scanning direction of the scanning line, and the vertical axis represents the sub scanning direction. Here, the main scanning and sub scanning in the FIGS. 3A and 3B corresponds to a main scanning and sub scanning in scanning an electrostatic latent image with a laser in accordance with transferred signal at the print portion 107, respectively. FIG. 3B shows how the bitmap data is sent out to the print portion 107, while being switched to line data corresponding to each of the scanning lines, so as to cancel out the profile. Here, n line represents a scanning line that is a target to be originally printed. In FIG. 3B, black portions represent line data that is sent to the print portion 107 at the time of the printing. By switching the lines for the data output (formed) to the print portion 107 according to the sub scanning position in which the scanning line is scanned so as to cancel out the profile as described above, even when exposure scanning is curved, an electrostatic latent image can be generated on an image carrying member on a photoconductive drum or the like without being distorted.

Figure 4:
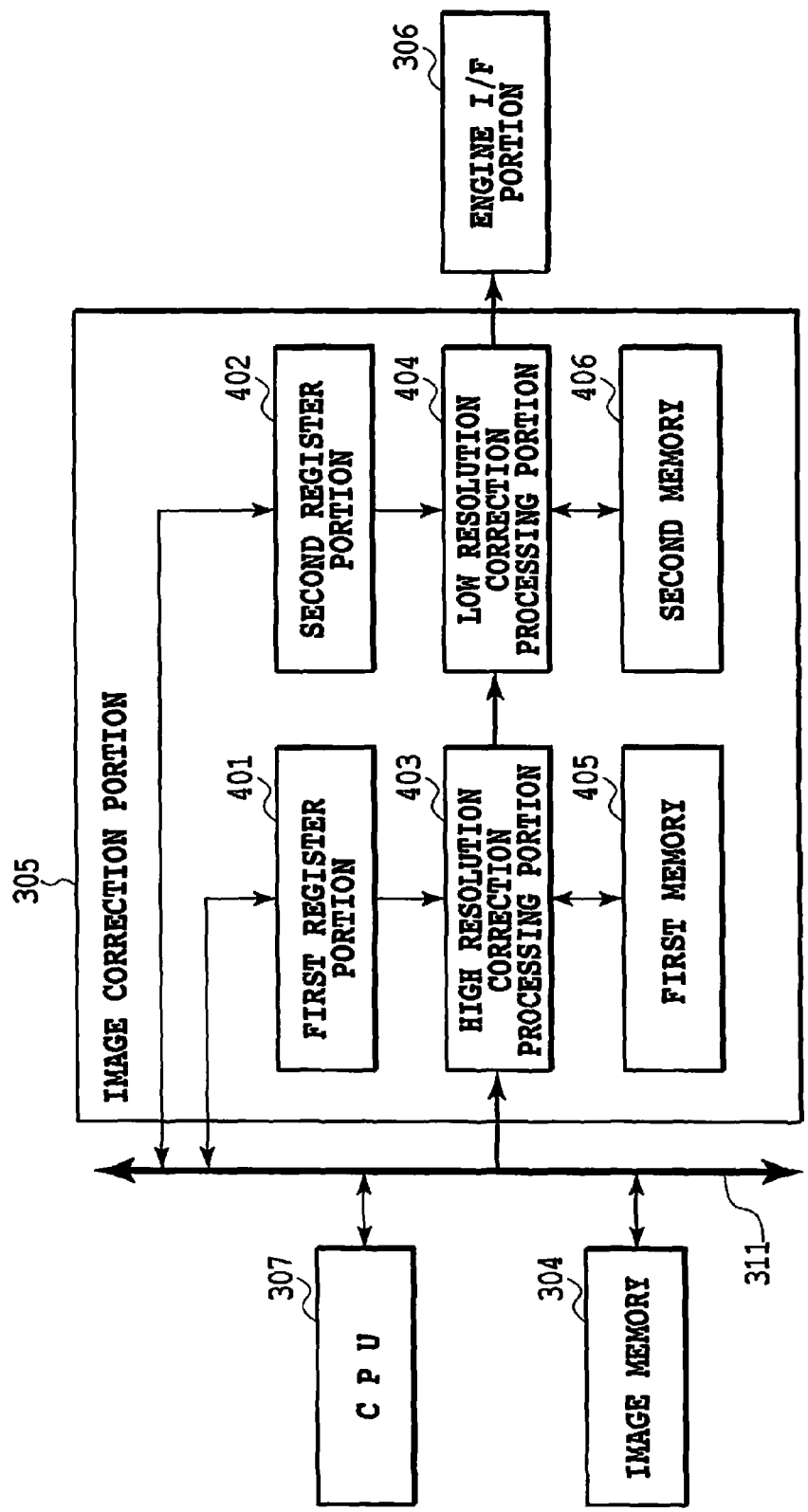
FIG. 4 is a block diagram showing the detailed configuration of an image correction portion of the printer controller according to the first embodiment of the present invention.

The detailed configuration of the image correction portion 305 will now be described with reference to FIG. 4. FIG. 4 is a block diagram showing the detailed configuration of the image correction portion 305 of the printer controller 103 according to the first embodiment of the present invention.

A first register portion 401 is configured with a plurality of registers (not shown). An instruction to a high resolution correction processing portion 403 from the CPU 307 is provided by the writing of appropriate values in the registers of the first register portion 401 by the CPU 307.

A first memory 405 is a memory (first storage portion) that is used by the high resolution correction processing portion 403, and is a line buffer that can store a plurality of lines of bitmap data corresponding to one line in the main scanning direction. Each time the bitmap data corresponding to one line is transferred, the first memory 405 stores the transferred bitmap data, shifts the stored bitmap data on an individual line basis and deletes the bitmap data that has been stored the longest time ago. By performing the operations described above, the bitmap data necessary for the high resolution correction processing is output. This first memory 405 is provided by a memory that can perform reading and writing and high speed random access, for example, the SRAM.

The high resolution correction processing portion 403 performs high resolution correction processing described later on the bitmap data input from the image memory 304 based on each register of the first register portion 401. The bitmap data on which the high resolution correction processing has been performed is output to a low resolution correction processing portion 404. The high resolution correction processing is processing for correcting registration deviation in the unit of a high resolution as compared with the processing unit of the low resolution correction processing.

A second register portion 402 is configured with a plurality of registers (not shown). An instruction to the low resolution correction processing portion 404 from the CPU 307 is provided by the writing of appropriate values in the registers of the second, register portion 402 by the CPU 307.

A second memory is a memory (second storage portion) that is used by the low resolution correction processing portion 404, and is provided by a memory that can perform reading and writing and easily increase its capacity, for example, the DRAM.

The low resolution correction processing portion 404 performs low resolution correction processing described later on the bitmap data input from the high resolution correction processing portion 403 based on each register of the second register portion 402. The low resolution correction processing is processing for correcting registration deviation in the unit of a resolution lower than the resolution of the image that is a target to be printed.

The high resolution correction processing and the low resolution correction processing performed by the image correction portion 305 according to the first embodiment of the present invention will now be described with reference to FIGS. 5 and 6. Broadly speaking, the high resolution level correction processing is performed with the SRAM, which can perform high speed random access whereas the low resolution level correction processing is performed with the DRAM. Here, since the low resolution level correction processing is performed with the DRAM, it is possible to reduce the number of times the registration deviation is corrected, that is, the number of times discontinuous memory address region is accessed as compared with the correction at the original high resolution level. In other words, since it is possible to increase the number of times the continuous memory address region of the DRAM is accessed, the low resolution level correction processing with the burst transfer is performed much more, thus, it is possible to effectively perform the technology for increasing the speed described above. It should be noted that, although, in the following description, an expression "correction processing on a high resolution portion and correction processing on a low resolution portion" is used, this expression is used for ease of description, and that resolution conversion processing is not actually performed. The "high resolution" and the "low resolution" are a relative conception; a resolution that is higher than a certain resolution is simply referred to as a "high resolution" and the former resolution is simply referred to as a "low resolution." It should be noted that, in the following example, an image of 2400 dpi that is referred to as a high resolution image can be referred to as a "low resolution" image depending on the situation.

In the present embodiment, bitmap data having a high resolution of 2400 dpi is a target on which to perform the image correction processing.

Figure 5:
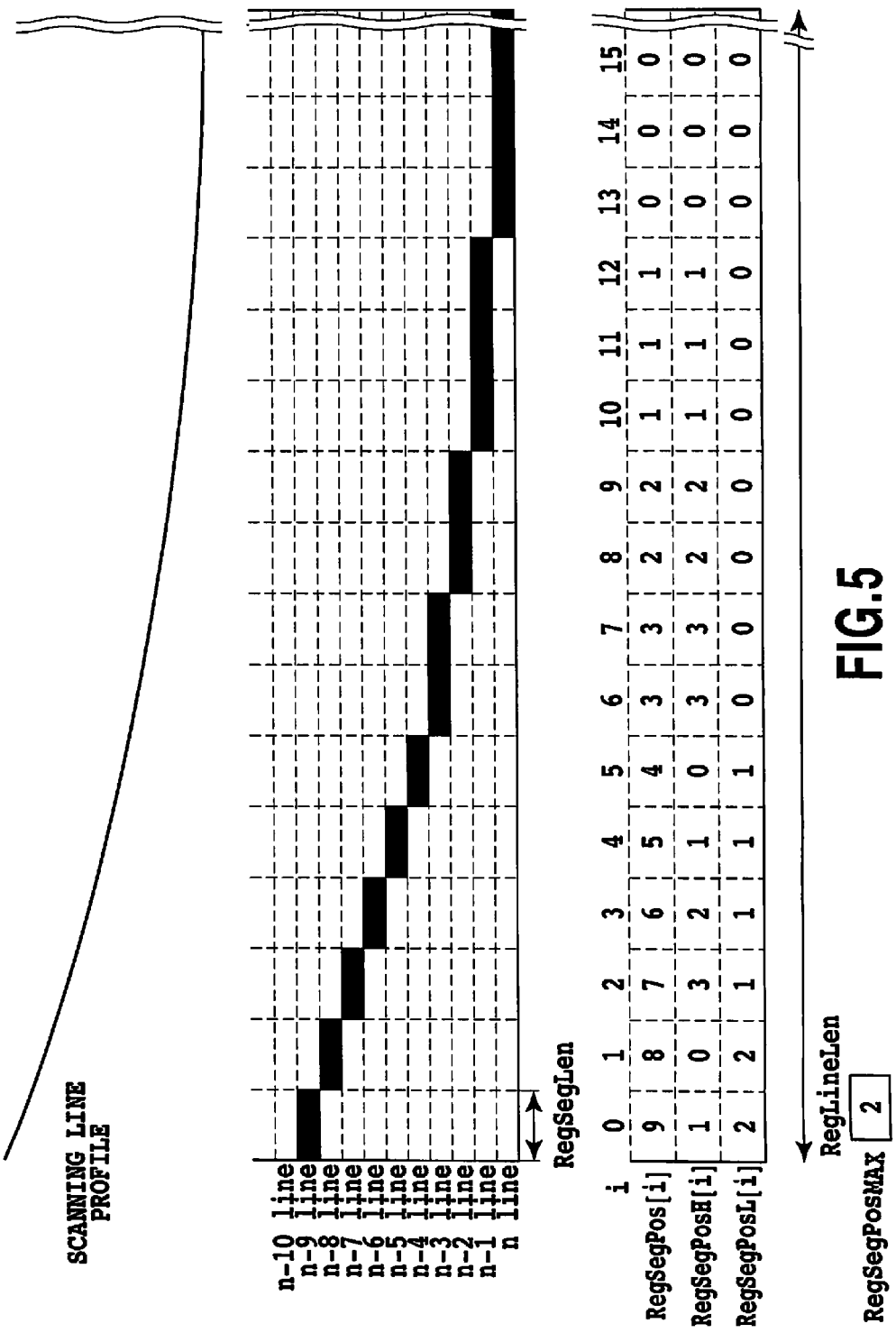
FIG. 5 is a diagram illustrating a method of specifying a profile to the image correction portion according to the first embodiment of the present invention.
Figure 6:
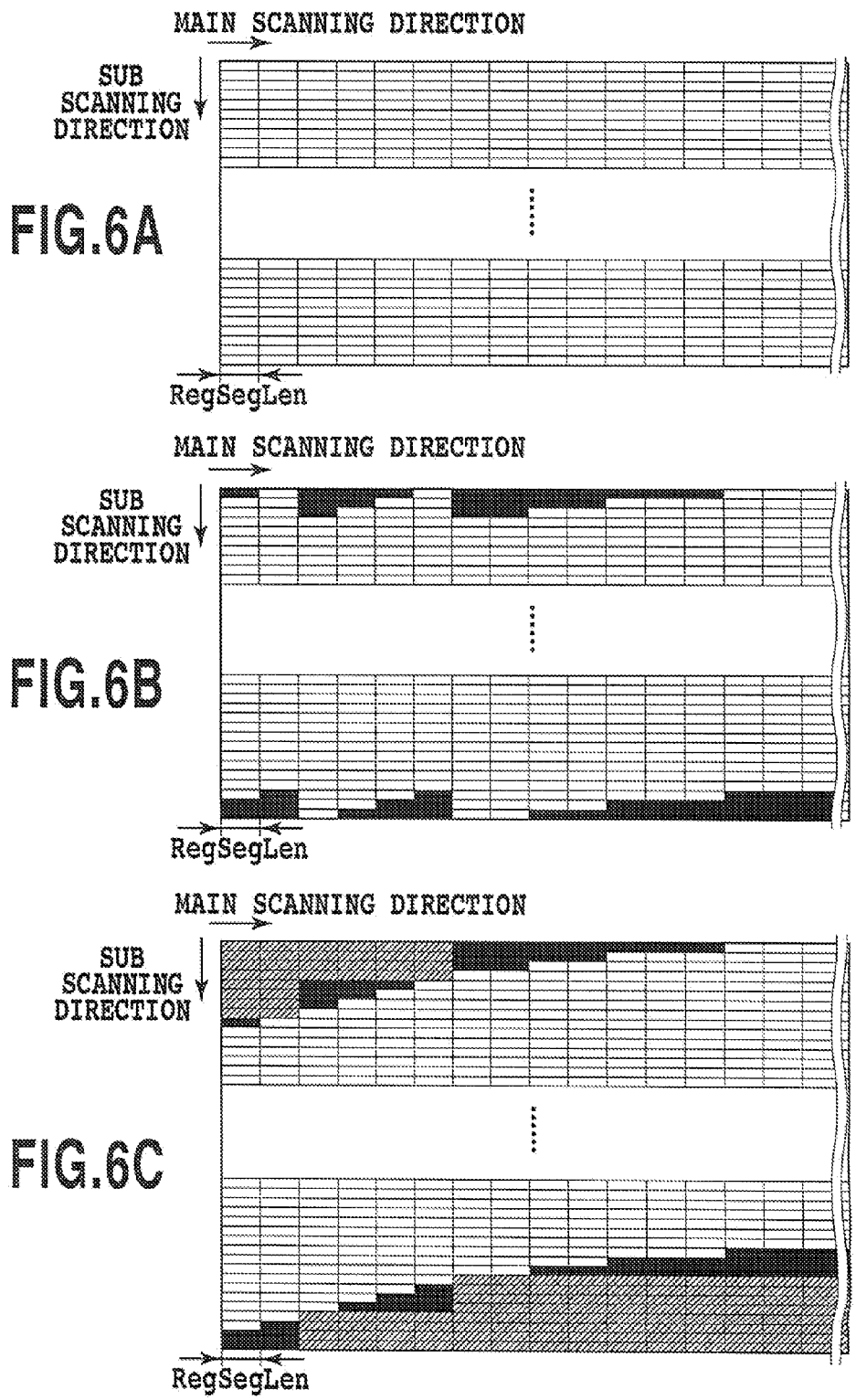
FIGS. 6A, 6B and 6C are diagrams illustrating image correction processing according to the first embodiment of the present invention.

FIG. 5 is a diagram illustrating a method of specifying the profile to the image correction portion 305 according to the first embodiment of the present invention. A scanning profile shown in FIG. 5 is assumed to be previously obtained by the printer controller 103 with a known method of detecting the amount of registration deviation.

Here, consider that one line of the bitmap data is divided into equal parts. In the following description, one of the divided parts is referred to as a segment. In the following description, the names of a segment length, the position of the sub scanning of each segment and the like represented by mixed-case indicate the names of the register of the first register portion 401 and the second register portion 402. As described above, the CPU 307 provides an instruction of an operation to the image correction portion 305 by writing a value in each of these registers.

A register RegSegLen for setting the length of each segment is provided in the first register portion 401 and the second register portion 402 of the image correction portion 305. A register RegLineLen for setting the length of the width of the main scanning is provided in the first register portion 401 and the second register portion 402 of the image correction portion 305.

Furthermore, the necessary number of register groups RegSegPosH[i] that indicate how much degree each segment is displaced in the sub scanning direction are provided in the first register portion 401 so as to cancel out the profile. The necessary number of register groups RegSegPosL[i] are also provided, in the second register portion 402. The variable i indicates how many segments there are from the end of the image to the segment in the main scanning direction. Here, the position of the sub scanning in the unit of a low resolution of 600 dpi with respect to the resolution of the bitmap to be processed is written in the register group RegSegPosL[i] referenced by the low resolution correction processing portion 404. The position of the sub scanning corresponding to a high resolution that cannot be expressed by the above-described low resolution unit is written in the register group RegSegPosH[i] referenced by the high resolution correction processing portion 403. Specifically, the segment (i−0) at the end of the image shown in FIG. 5 is displaced nine lines in the sub scanning direction at a resolution of 2400 dpi (see RegSegPos [i]). Here, the bottom line in the sub scanning direction is assumed to be the reference that is "0"; how many lines the segment is displaced in the unit of a low resolution is specified. Hence, in RegSegPosL[0] for setting a value in the unit of a low resolution of 600 dpi, 2 ("010" in binary code) obtained by discarding the low two bits of 9 ("01001" in binary code) is written. In RegSegPosH[0] for setting the position of the sub scanning corresponding to the high resolution, 1 that is the value of the discarded low two bits alone ("01" in binary code) is written. In other words, the remainder of the position of the sub scanning in each position of the main scanning indicated by RegSegPosL[i] is written. Furthermore, RegSegPosMAX for setting the maximum position of the sub scanning in the unit of a low resolution in the profile is provided in the second register portion 402. RegSegPosMAX is equal to the maximum value of the values stored in RegSegPosL[i]. As described above, only correction information necessary for the high resolution correction processing portion 403 and the low resolution correction processing portion 404 is set, and thus it is possible to reduce an unnecessary increase in the size of the circuit.

Although, in the present embodiment, in one scanning line, the value of the segment length RegSegLen is fixed, it may be set variable. RegSegPosL[i] shown in FIG. 5 is shown for ease of description; it may not be set in the first register portion 401 and the second register portion 402. Information stored in each of the registers described above is referred to as sub scanning position information. Information set in the first register portion 401 is referred to as high resolution correction information; information set in the second register portion 402 is referred to as low resolution correction information.

The image correction processing for correcting registration deviation according to the scanning profile shown in FIG. 5 with reference to FIGS. 6A to 6C will now be described.

FIG. 6A shows bitmap data that is stored in the image memory 304, that has a resolution of 2400 dpi and that has the amount of data of one bit per pixel. The high resolution correction processing portion 403 performs, with the CPU, the high resolution correction processing on this bitmap data according to the register value set in the first register portion 401.

FIG. 6B is a diagram showing the bitmap data on which the high resolution correction processing has been performed. The high resolution correction processing portion 403 uses the first memory 405 to form a processing window corresponding to a total of four lines including bitmap data in which 0, 1, 2 and 3 lines are delayed. The high resolution correction processing portion 403 further references RegSegPosH[i] corresponding to a position in the main scanning direction to perform sampling processing on the delayed bitmap data. Specifically, the high resolution correction processing portion 403 performs the sampling processing on the bitmap data in which 0 line is delayed when RegSegPosH[i] is 0, 1 line is delayed when RegSegPosH[i] is 1, 2 line is delayed when RegSegPosH[i] is 2 or 3 line is delayed when RegSegPosH[i] is 3. The sampling refers to processing for extracting data within the output processing window. The high resolution correction processing portion 403 outputs, to the low resolution correction processing portion, the bitmap data that has been subjected to the sampling. Hence, the first memory 405 has such a memory capacity that it can read and write bitmap data corresponding to sit least three lines (it can form a processing window corresponding to the total of four lines including one line that is not delayed). As described above, the first memory 405 is configured as a relatively small number of line buffers, and data can be output to the low resolution correction processing portion. The line buffers preferably form a processing window corresponding to at least the processing unit in the low resolution correction processing. In order for bitmap data including all the input bitmap data to be output, white data or the like (dummy data) is added to a region indicated by black in FIG. 6B, that is, a sampling target region free from data.

FIG. 6C is a diagram showing bitmap data obtained by performing the low resolution correction processing on the bitmap data on which the high resolution correction processing has been performed. First, the low resolution correction processing portion 404 sequentially writes, in the second memory 406, the bitmap data input from the high resolution correction processing portion 403. The low resolution correction processing portion 404 writes bitmap data corresponding to at least (RegSegPosMAX+1)×4 lines. Thereafter, RegSegPosL[i] corresponding to the position in the main scanning direction is then referenced, and bitmap data written before RegSegPosL[i]×4 lines is sequentially read from the memory of the corresponding address. As long as how much data has been read can be controlled, before the completion of the writing of the bitmap data corresponding to (RegSegPosMAX+1)×4 lines, data can also be read sequentially. Here, "×4" means that 600 dpi corresponds to four lines of 2400 dpi. In other words, it means the number of lines corresponding to the processing window formed in the first memory 405 used in the high resolution correction processing portion 403. The memory storing the bitmap data of the read line, then, stores the successive bitmap data that is input again. By performing the operations described above, the second memory has such a memory capacity that it can read and write bitmap data corresponding to at least (RegSegPosMAX+1)×4 lines. In the present embodiment, the value of RegSegPosMAX is two, thus, the memory capacity corresponding to (2+1)×4=12 lines is needed.

When the image correction is performed from end to end over the image in the 1 mm sub scanning direction on bitmap data having a resolution of 2400 dpi, one bit per pixel and a main scanning width of 300 mm, the following formulas hold true:

(300 mm/25.4 mm/inch)×2400 dpi≈28346

(1 mm/25.4 mm)×600 dpi≈24

(24+1)×4=100.

Hence, it is necessary to have a memory capacity of at least 100 lines=2834600 bits for each color. RegSegPosMAX that sets the maximum of the position of the sub scanning in the unit of a low resolution in the above formulas is 24 as in the above calculation. If the memory having such a capacity is included as a SRAM within an ASIC, the size of the ASIC is increased, and this becomes a factor for increasing the cost of the ASIC. Hence, as described above, the second memory 406 is included as a memory outside the ASIC, and is included as a memory whose capacity is easily increased, for example, the DRAM. Here, when the image correction is performed, from end to end over the image in the 1 mm sub scanning direction on bitmap data having a resolution of 2400 dpi, one bit per pixel and a main scanning width of 300 mm, the number of times the memory access that is not continuous addresses is performed is 24. As compared with 95 times when the image correction is performed only by reading from one memory, the number of times the address is switched is decreased. When bitmap data is not present in the read address, white data or the like (dummy data) is added to a region indicated by oblique lines in FIG. 6C.

As described above, the image correction portion 305 reads the bitmap data from the image memory 304, performs the image correction processing and transfers it to the print portion 107. Then, the print portion 107 scans, with laser light, the photoconductive drum (image carrying member) based on the image data on one scanning line, and forms an electrostatic latent image of the one scanning line on the photoconductive drum. Here, the electrostatic latent image refers to an image having a potential difference corresponding to the image data that is generated on the photoconductive drum by applying (scanning) laser light to the photoconductive drum charged at a predetermined potential. Then, the print portion 107 causes toner to adhere to the electrostatic latent image to form a toner image corresponding to the potential difference on the photoconductive drum, further transfers the toner image to a sheet and forms the image on the sheet.

Furthermore, when the color image forming apparatus has image formation units corresponding to a plurality of colors (CYMK), the data transfer method according to the present embodiment is performed in each of the image formation units of those colors, and thus it is possible to prevent color displacement resulting from the registration deviation of those colors. This is the same as in each embodiment that will be described below.

As described above, according to the present embodiment, the image correction processing is divided into two stages, the high resolution correction processing using the line buffers formed with the memory which allows high speed random access and the low resolution correction processing using the memory whose capacity is easily increased. Consequently, even when the curving of the scanning line is produced on an individual color basis, the number of times discontinuous address region is accessed is reduced, and thus it is possible to rapidly prevent color displacement resulting from the registration deviation.

Second Embodiment

A description has been given of the example where the low resolution correction processing portion 404 takes over the second memory 406 in the image correction portion 305 shown in FIG. 4. The image memory 304 and the second memory 406 are often included as an external memory device of an integral circuit device such as an ASIC. When a large number of components are required as described above, the number of components is increased, and this leads to the increase in the cost. Hence, in the second embodiment, a description will be given of a case where the second memory 406 and the image memory 304 are shared.

Figure 7:
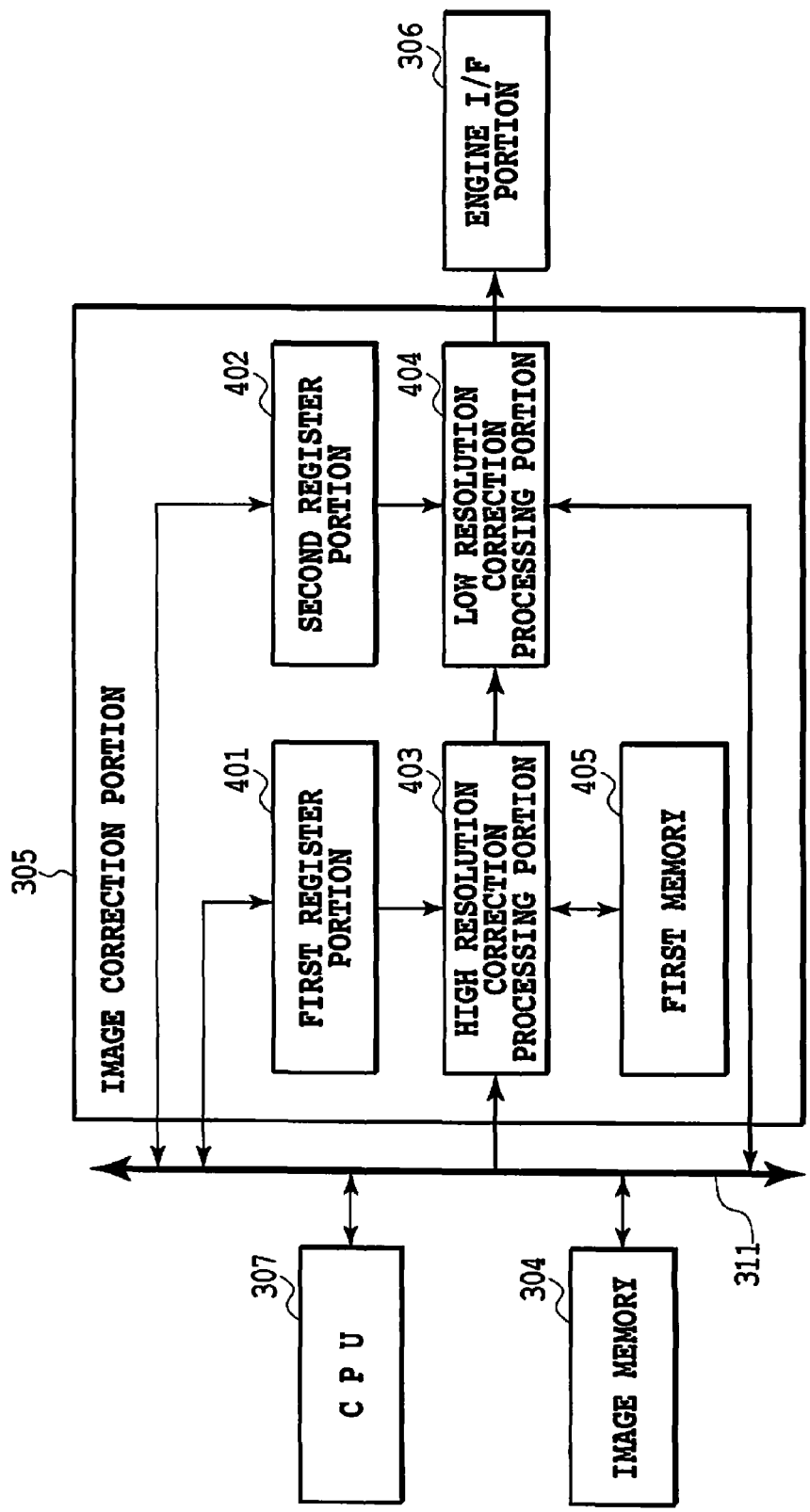
FIG. 7 is a block diagram showing the detailed configuration of an image correction portion of a printer controller according to a second embodiment of the present invention.

FIG. 7 is a diagram showing a configuration in which one region of the image memory 304 is used as the second memory 406. The low resolution correction processing portion 404 shown in FIG. 7 reads and writes bitmap data through a system bus 311, and thereby performs the low resolution correction processing.

Third Embodiment

Figure 8:
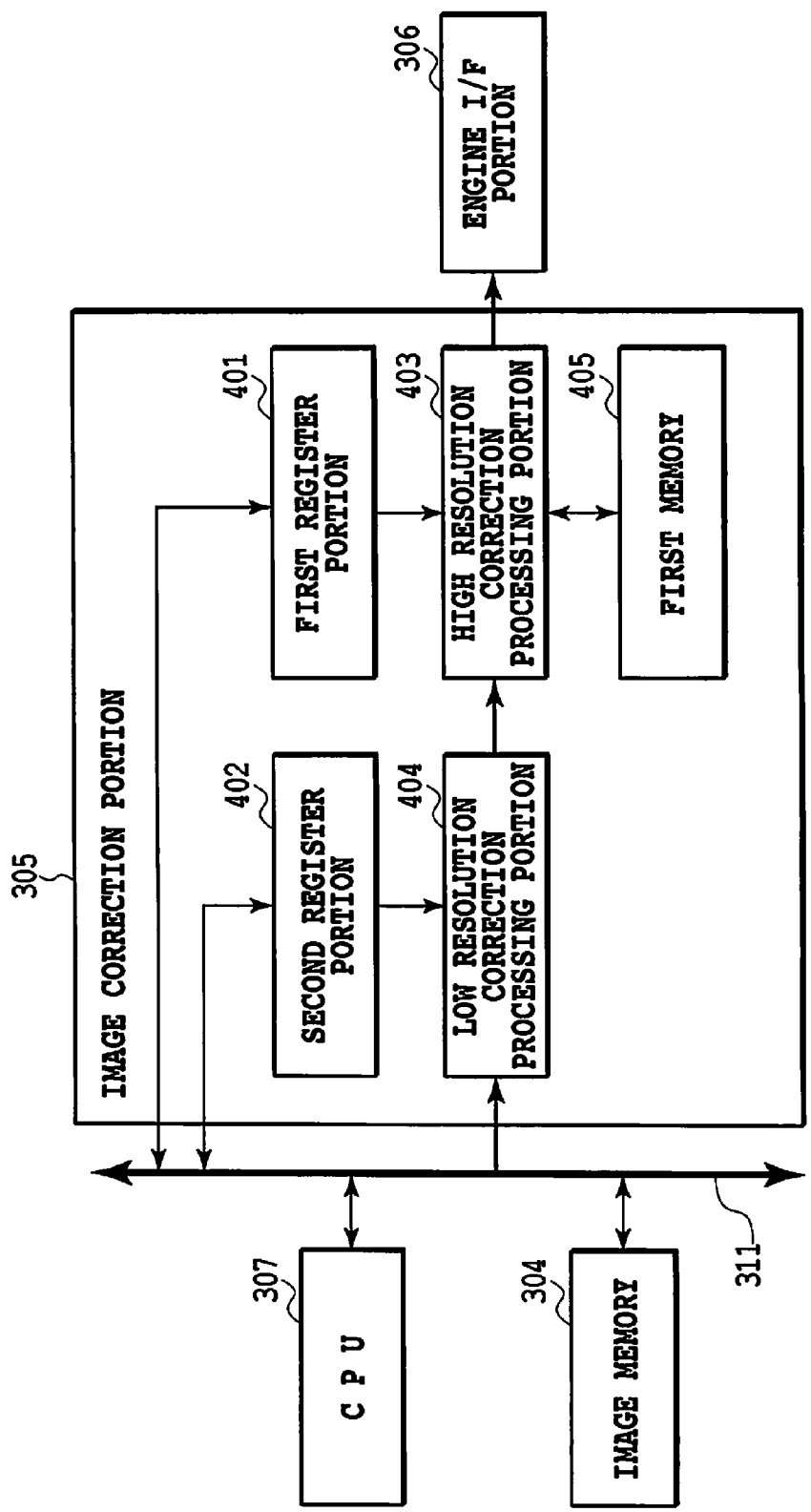
FIG. 8 is a block diagram showing the detailed configuration of an image correction portion of a printer controller according to a third embodiment of the present invention.

In the first and second embodiments, a description has been given of the example where the nigh resolution correction processing is performed on the upstream side of the image correction portion, and the low resolution correction processing is performed on the data that has been subjected to the high resolution correction processing. However, a configuration in which the second memory 406 and the image memory 304 are shared and the order of connection between the low resolution correction processing portion 404 and the high resolution correction processing portion 403 is changed can be considered. FIG. 8 is a diagram showing such a configuration. In the low resolution correction processing portion 404 shown in FIG. 4, the input bitmap data is first written in the second memory 406, and, when it is then read, the read address is changed based on RegSegPosL[i]. When the low resolution correction processing portion 404 shown in FIG. 8 reads the image data from the image memory 304, the low resolution correction processing portion 404 changes the read address based on RegSegPosL[i], and thereby performs the low resolution correction processing. Here, the bitmap data on which the low resolution correction processing has been performed is then input to the high resolution correction processing portion 403, and is subjected to the high resolution correction processing.

In this way, even when the curving of the scanning line is produced on an individual color basis, it is possible to prevent color displacement resulting from the registration deviation without the number of components of the printer controller 103 being increased.

Other Embodiments

Although, in the example of FIG. 8, a description has been given of the configuration in which the image memory 304 and the second memory 406 are shared, as described in the first embodiment, the second memory 406 may be taken over by the low resolution correction processing portion 404.

In each of the embodiments described above, a description has been given of the example where the DRAM, which enhances the performance of access to the continuous memory address, is used as the second memory 406. However, the second memory 406 may be formed with another type of RAM.

Specifically, the image correction processing can be divided into two stages, the high resolution correction processing using the line buffers formed with the memory which allows high speed random access and the low resolution correction processing using a predetermined memory. Thus, it is possible not only to enhance access to the memory address, which is unique to the DRAM, but also to enhance performance at the time of transfer of a bus.

Although, in each of the embodiments described above, a description has been given of the correction of the image per pixel, interpolation processing on an image of less than one pixel may be additionally performed. Although, in each of the embodiments described above, a description has been given of the case where the resolution of the high resolution, correction processing is the same as that input to the image memory 304, it may not always be the same resolution. For example, by using the above interpolation processing, the resolution of the high resolution correction processing may be lower than that of an image input.

Other Embodiments

Aspects of the present invention can also be realised by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass ail such modifications and equivalent structures and functions.

This application claims the benefit of Japanese Patent Application No. 2011-029590, filed Feb. 15, 2011, which is hereby incorporated by reference herein in its entirety.

What is claimed is:

1. An image forming apparatus including an image forming unit, comprising:

an obtaining component configured to obtain shift amounts in a sub scanning direction of a scanning line formed by the image forming unit at respective positions in a main scanning direction for an image which includes pixels, each of the shift amounts at the respective positions including a first shift amount equivalent to a first number of pixels and a second shift amount equivalent to a second number of pixels, wherein the first number of pixels corresponds to an integer less than a predetermined number of pixels for a predetermined resolution, and the second number of pixels corresponds to a multiple of the predetermined number of pixels for the predetermined resolution;

a first correction component configured to correct the image by shifting, in the sub scanning direction, a pixel included in the image at each of the positions in the main scanning direction on a basis of the first shift amount to write the shifted pixel to a corresponding address in a memory; and a second correction component configured to correct the image corrected by the first correction component, by shifting a read address in the sub scanning direction in the memory at a corresponding position among the respective positions in the main scanning direction, at which the second shift amount shifts, on a basis of the second shift amount and reading out, by continuous address access in the main scanning direction in a unit which is determined based on the second shift amount, pixels stored in addresses continuous in the main scanning direction in the memory.

2. The image forming apparatus according to claim 1, wherein a resolution of an image including pixels to be shifted by the first correction component corresponds to the predetermined resolution, a resolution of an image including pixels which have been shifted by the first correction component corresponds to the predetermined resolution, a resolution of an image including pixels to be shifted by the second correction component corresponds to the predetermined resolution, and a resolution of an image including pixels which have been shifted by the second correction component corresponds to the predetermined resolution.

3. The image forming apparatus according to claim 2, wherein the predetermined resolution is 2400 dots per inch.

4. The image forming apparatus according to claim 1, wherein the first number of pixels corresponds to a remainder obtained by dividing each of the obtained shift amounts by the predetermined number of pixels, and wherein the second number of pixels corresponds to a difference between each of the obtained shift amounts and the remainder.

5. The image forming apparatus according to claim 4, wherein the predetermined number of pixels is four.

6. The image forming apparatus according to claim 1, wherein the first correction component shifts the pixel included in the image in the sub scanning direction by using another memory, and the second correction component shifts the pixel included in the image in the sub scanning direction by using the memory, and wherein the another memory is capable of performing random access with a speed higher than a speed of the memory.

7. The image forming apparatus according to claim 1, wherein the continuous address access is performed by a burst transfer for a plurality of pixels.

8. The image forming apparatus according to claim 6, wherein the another memory is configured to store pixels corresponding to a plurality of lines, each line including pixels arranged in a main scanning direction, and wherein the first correction component performs the correction by determining one line from the plurality of lines based on the first number of pixels and outputs the pixel included in the determined line.

9. The image forming apparatus according to claim 6, wherein the second correction component performs the correction by shifting the pixel by the second number of pixels included in the image in the sub scanning direction, which has been shifted by the first correction component.

10. The image forming apparatus according to claim 6, wherein the second memory is capable of performing continuous address access with a speed higher than a speed of a random address access.

11. The image forming apparatus according to claim 6, wherein the first and second correction components consist of an ASIC, the another memory is arranged inside of the ASIC, and the memory is arranged outside of the ASIC.

12. An image processing apparatus comprising:

a first memory configured to store an image including pixels;

an obtaining component configured to obtain shift amounts of sub scanning position of pixels at respective main scanning positions of the image, each of the shift amounts of sub scanning position being sum of a first shift amount and a second shift amount, wherein the first shift amount corresponds to less than a fixed number of pixels, the second shift amount corresponds to a multiple of the fixed number of pixels;

a first correction component configured to store the image in the first memory into a second memory, and to output pixels from the second memory sequentially, whose sub scanning positions at the respective main scanning positions in the second memory is determined based on respective first shift amounts, to respective continuous addresses in a third memory as much as number of pixels corresponding to one main scanning line, so that sub scanning positions of pixels at continuous main scanning positions in the second memory, where respective second shift amounts are equivalent, are shifted by the respective first shift amounts to store the pixels to continuous addresses in the third memory; and a second correction component configured to read out, by continuous address access in a unit which is determined based on the respective second shift amounts, the pixels corresponding to one main scanning line sequentially output in the third memory, so that the sub scanning positions of the pixels at the continuous main scanning positions in the third memory, where the respective second shift amounts are equivalent, are shifted by the respective second shift amounts.

13. An image processing method using a first memory, a second memory and a third memory, comprising:

obtaining shift amounts in a sub scanning direction at respective main scanning positions of an image in the first memory, each of the shift amounts being sum of a first shift amount and a second shift amount, wherein the first shift amount corresponds to less than a first predetermined lines, and the second shift amount corresponds to a multiple of the first predetermined lines; and repeating following (i), (ii) and (iii) so that the third memory stores part of the image corresponding to a second predetermined lines, wherein the number of the second predetermined lines is larger than the first predetermined lines:

(i) storing to the second memory, among the image in the first memory, an image within a processing window consist of the number of first predetermined lines;

(ii) outputting pixels one by one at the respective main scanning positions from the first predetermined lines in the second memory to continuous addresses of one line as a output destination line in the third memory based on the respective first shift amounts; and (iii) shifting the processing window and the output destination line in the sub scanning direction by one line; and reading out pixels one by one at the respective main scanning positions from the second predetermined lines in the third memory by continuous address access in the main scanning direction in a unit which is determined based on the respective second shift amounts, to output the read out pixels as one line.

14. The image processing method according to claim 13, wherein the reading out is performed by a burst transfer of pixels at respective continuous positions in the main scanning direction equivalent to the second shift amount.

15. The image processing method according to claim 13, wherein the second memory capable of performing continuous address access with a speed higher than a speed of a random address access.

* * * * *